United States Patent [19]
Lee et al.

[11] Patent Number: 5,353,224
[45] Date of Patent: Oct. 4, 1994

[54] METHOD FOR AUTOMATICALLY CONTROLLING A TRAVELLING AND CLEANING OPERATION OF VACUUM CLEANERS

[75] Inventors: Jang W. Lee; Jin S. Hwang, both of Busan, Rep. of Korea

[73] Assignee: Goldstar Co., Ltd., Seoul, Rep. of Korea

[21] Appl. No.: 804,236

[22] Filed: Dec. 5, 1991

[30] Foreign Application Priority Data

Dec. 7, 1990 [KR] Rep. of Korea ............... 20100/1990

[51] Int. Cl.$^5$ ............................................ G06F 15/50
[52] U.S. Cl. ................. 364/424.02; 318/587; 180/167
[58] Field of Search ................ 364/424.02; 318/587; 395/95; 180/167, 168, 169; 15/319

[56] References Cited

U.S. PATENT DOCUMENTS

| | | | |
|---|---|---|---|
| 4,674,048 | 6/1987 | Okumura | 364/424.02 |
| 4,700,427 | 10/1987 | Knepper | 318/587 |
| 4,962,453 | 10/1990 | Pong et al. | 364/424.02 |
| 5,020,620 | 6/1991 | Field | 364/424.02 |
| 5,032,775 | 7/1991 | Mizuno et al. | 364/424.02 |

FOREIGN PATENT DOCUMENTS

| | | |
|---|---|---|
| 0142594 | 5/1985 | European Pat. Off. . |
| 2255651 | 7/1975 | France . |
| 2231416 | 11/1990 | United Kingdom . |

*Primary Examiner*—Gary Chin
*Attorney, Agent, or Firm*—Brumbaugh, Graves, Donohue & Raymond

[57] ABSTRACT

A method for automatically controlling a travelling and cleaning operation of a vacuum cleaner. The method comprises a learning travel step for calculating and storing straight travelling distances of outline paths and path directions together with the total number of the outline paths, a two-dimensional coordinates calculating step for determining positions of straight division lines by using data of the travelling distances and the path directions, and calculating two-dimensional coordinates of cleaning blocks determining positions and areas of the cleaning blocks, a cleaning block discriminating step for discriminating integrated cleaning regions each comprising a plurality of sequential cleaning blocks of which each lower end or upper end coincides with an outline path of the cleaning region, and determining a cleaning start block and a cleaning end block of the integrated cleaning region, and a practical cleaning step for controlling the cleaner to travel along a travelling path from a cleaning start block to a cleaning end block of the integrated cleaning region, and turn in 180° turning reverse, then travel from the cleaning end block to the cleaning start block simultaneously with overlapping the cleaning blocks in a predetermined overlapping value.

10 Claims, 14 Drawing Sheets

| PD(i) | PATH DIRECTION OF i-TH PATH |
| PL(i) | PATH DISTANCE OF i-TH PATH |
| m(i) | TOTAL NUMBER OF PATHS |

```
PD(1) = 0     PL(1) = 20
PD(2) = 3     PL(2) = 15
PD(3) = 0     PL(3) = 30
PD(4) = 1     PL(4) = 50
PD(5) = 2     PL(5) = 20
PD(6) = 1     PL(6) = 20
PD(7) = 2     PL(7) = 30
PD(8) = 3     PL(8) = 55
     mi = 8
```

| x(k) | x-COORDINATE OF A BLOCK OF k-TH LONGITUDINAL LINE |
|---|---|
| y(j) | y-COORDINATE OF A BLOCK OF j-TH LATERAL LINE |
| m k | TOTAL NUMBER OF LONGITUDINAL LINES |
| m j | TOTAL NUMBER OF LATERAL LINES |

| | |
|---|---|
| x(1) = −15 | y(1) = 20 |
| x(2) = 35 | y(2) = 50 |
| x(3) = 55 | y(3) = 30 |
| x(4) = 0 | y(4) = 0 |
| m k = 4 | m j = 4 |

| | |
|---|---|
| x(1) = −15 | y(1) = 0 |
| x(2) = 0 | y(2) = 20 |
| x(3) = 35 | y(3) = 30 |
| x(4) = 55 | y(4) = 50 |
| mk = 4 | mj = 4 |

FIG.9A

|  |  |  |
|---|---|---|
| B(3,1) | B(3,2) | B(3,3) |
| B(2,1) | B(2,2) | B(2,3) |
| B(1,1) | B(1,2) | B(1,3) |

FIG.9B

| B(i,j) | BLOCK OF i-TH COLUMN, j-TH ROW |
|---|---|
| S(j),(L) | COLUMN NUMBER OF START BLOCK OF j-TH ROW, L-TH LAYER |
| E(j),(L) | COLUMN NUMBER OF END BLOCK OF j-TH ROW, L-TH LAYER |
| ML | MAXIMUM NUMBER OF CLEANING LAYERS |

FIG.9C

| | |
|---|---|
| S(1),(1)=2 | E(1),(1)=3 |
| S(2),(1)=1 | E(2),(1)=3 |
| S(3),(1)=1 | E(3),(1)=2 |
| ML = 1 | |

FIG.9D

| B(4,1) | B(4,2) | B(4,3) |
|---|---|---|
| B(3,1) | B(3,2) | B(3,3) |
| B(2,1) | B(2,2) | B(2,3) |
| B(1,1) | B(1,2) | B(1,3) |

FIG.9E

| | |
|---|---|
| S(1),(1) =1 | E(1),(1) =1 |
| S(1),(2) =3 | E(1),(2) =4 |
| S(2),(1) =1 | E(2),(1) =4 |
| S(3),(1) =1 | E(3),(1) =3 |
| ML = 2 | |

METHOD FOR AUTOMATICALLY CONTROLLING A TRAVELLING AND CLEANING OPERATION OF VACUUM CLEANERS

BACKGROUND OF THE INVENTION

1. Field of the Invention

The present invention relates to a vacuum cleaner, and more particularly to an automatic control method for controlling a travelling and cleaning operation of such a vacuum cleaner, which during an operator's designation for a cleaning region simultaneously with causing the cleaner to travel along the outline path of the cleaning region by using a remote controller, stores data for sectional distances of travelling paths of the outline path of the cleaning region and path directions, then divides the cleaning region into a plurality of cleaning blocks by using the data for the sectional distances and the path directions, thereafter, controls the cleaner to travel along the sequential cleaning blocks in order to clean the cleaning blocks simultaneously with overlapping a predetermined width of each cleaning block.

2. Description of the Prior Art

As shown in FIGS. 11 and 12, in which FIG. 11 is a block diagram showing a construction of a known vacuum cleaner, and FIG. 12 is a schematic plane view showing the construction of the cleaner of FIG. 11, the known cleaner comprises a travelling control circuit 31 for controlling the travelling and cleaning operation of the cleaner, a position discriminating circuit 32 for discriminating the present position of the cleaner represented in two-dimensional coordinates, that is, a x-coordinate and a y-coordinate, in every unit travelling distance. The known cleaner includes a manipulating part 33 for turning on/off the electric system of the cleaner, changing a travelling mode of the cleaner, determining a start position of the cleaning operation and adjusting photosensitivity of sensors, a remote transmitter 34 and a remote receiver 35 for carrying out a remote control for the cleaner, a reversible driving motor 38a and 38b for driving a front wheel 36 and a pair of rear wheels 37a and 37b, respectively. The front wheel 36 is disposed at a front portion of the cleaner but the rear wheels 37a and 37b are disposed at right and left sides of a rear portion of the cleaner, respectively. The known cleaner is also provided with a suction motor 40 for driving a pair of dust suction parts 39 disposed at both sides of a front portion of the cleaner.

In addition, the known vacuum cleaner is provided with a motor driving part 41 for driving the motors, a plurality of obstacle sensors 42 each for sensing an obstacle which may be in the travelling paths of the cleaner, calculating the distance between the cleaner and the obstacle in case of sensing an obstacle, then outputting an electric signal corresponding to the sensing of the obstacle to the control circuit 31, a pair of contact sensors 44 for outputting an electric signal corresponding to a state of contacting with the obstacle in the travelling paths of the cleaner to the control circuit 31 and a signal amplifier 53 for amplifying the electric signals applied from the sensors 42 and 44 thereto, then outputting the amplified signals to the control circuit 31.

On the other hand, the position discriminating circuit 32 is provided with a distance sensor 45 for outputting an electric signal corresponding to the travelling distance of the cleaner, for example, a pulse signal being directly proportional to revolutions of the front and rear wheels 36, 37a and 37b, to the control circuit 31, a direction sensor 46, for example, a gyrometer, for sensing a path directional change of the cleaner. While, the control circuit 31 provided with a central processing unit 47 (hereinafter, referred to simply as "the CPU") for controlling the control system of the cleaner, a plurality of input and output ports 48 by/from which the data signals are inputted and outputted, a ROM 49 and a RAM 50 for storing control programs and informing data therein, a clock 51 for generating a system clock and an interrupt controller 52 for performing an interrupt control routine.

The travelling operation synchronizing with the cleaning operation of the known cleaner will be described in detail in conjunction with FIGS. 13 and 14. FIG. 13 is a flowchart showing a process for controlling the known cleaner of FIG. 11, and FIG. 14 is a schematic view showing the trace of wheels of the known cleaner resulting from a travelling and cleaning operation by means of the process of FIG. 13.

As shown in FIG. 14, there is an obstacle X disposed at a center portion of the rectangular cleaning region which is to be cleaned by the cleaner of FIG. 11. Here, the user first manipulates the manipulating part 33 in order to select a learning travel mode, then remotely controls the cleaner by means of a remote controller in order to locate the cleaner at a start position S. Thereafter, a set button of the manipulating part 33 is manipulated in order to set the two-dimensional coordinates (xo and yo) of the start position S and a reference angle $\Theta_o$ in the path direction of the cleaner.

Sequentially, the cleaner travels along the outer paths represented at the phantom line of FIG. 14 in accordance with a remote control by virtue of the remote control transmitter 34, thereby starting the learning travel step of the control process. At this time, the position discriminating circuit 32 determines the present position of the cleaner in the type of x and y coordinates and an angle $\Theta$ in the path direction, then outputs electric signals corresponding to the present position and the angle $\Theta$ to the CPU 47 wherein the present position and the angle $\Theta$ are stored in the RAM 50. Upon accomplishing the learning travel step of the cleaner 30, the CPU 47 divides the cleaning region by a unit distance, that is, a width "W" of the cleaner 30, parallel with the x-axis and the y axis of the two-dimensional reference system, thereby dividing the cleaning region into n cleaning blocks, then stores the n blocks on a memory map in the RAM 50.

Thereafter, the user locates the cleaner 30 at the start position S or at a position A near the start position S, then manipulates the manipulating part 33 in order to change the operational mode of the cleaner 30 from the learning travel mode into an unmanned travel mode. In result, the motor driving part 41 drives the wheel motors 38a and 38b under the control of the control circuit 31, thereby causing the cleaner 30 to travel along a first travelling path. At the same time, the suction motor 40 drives the dust suction part 39 in order to perform the cleaning operation.

Here, the cleaner 30 automatically and sequentially travels along a first column of the cleaning blocks which includes the position A. At this time, upon sequentially travelling along the first column, the CPU 47 stores the cleaning blocks, on which blocks the cleaner 30 has passed, simultaneously with erasing the number of said blocks, on which the cleaner 30 has passed, from the total number of the total blocks which have been stored in the RAM 50. Simultaneously with discriminating the present position of the cleaner 30 and the outline of the cleaning region by means of the position discriminating circuit 32, determining whether there is the obstacle X on the present travelling path of the cleaner 30 by means of the obstacle sensors 42, and changing the path direction, the CPU 47 controls the cleaner 30 in order to sequentially travel along the next column.

Upon sensing the obstacle X disposed at the F position, the CPU 47 changes the path direction of the cleaner 30 in order to allow the cleaner to travel along columns of the cleaning blocks which are not yet cleaned. At the same time, the CPU 47 stores in the RAM 50 the cleaning blocks, on which blocks the obstacle X is disposed, thereby making it impossible to clean said blocks, then controls the cleaner 30 to repeatedly travel, under a reciprocating motion, between the obstacle X and the outline of the cleaning region. Then, upon determining that the obstacle X is not sensed, the CPU 47 controls the cleaner 30 to simply travel along a straight column in order to reach a B position.

Upon reaching the B position, the obstacle sensor 42 and the position discriminating circuit 32 outputs respective signals to the CPU 47, said signals informing of a condition that there are several cleaning blocks which are not yet cleaned in the right side of the B position. In result, the CPU 47 stores the two-dimensional coordinates of the B position in the RAM 50, then controls the cleaner 30 to repeatedly travel, under the reciprocating motion, between the obstacle X and the outline of the cleaning region, thereby causing the cleaner to reach the C position. Thereafter, the cleaner 30 is controlled in order to return to the D position, then travels, in the same manner as above-described, along the remaining columns of the cleaning blocks which are to be cleaned thereby. In result, the cleaner 30 reaches the position G in order to stop the travelling and cleaning operation thereof.

However, in the above-mentioned method for automatically controlling the travelling and cleaning operation of the cleaner, the cleaning region after having been designated by performance of the learning travel step is divided by a plurality of x axis and y axis on the basis of an unit distance, that is, the width of the cleaner, into n regular square cleaning blocks. Thereafter, the blocks are stored on a memory map provided in a RAM of control circuit. In addition, upon storing the cleaning region in the RAM by storing the cleaning blocks in the same number of memory locations as that of the blocks, the CPU stores data for cleaning accomplishment of a cleaning block, on which block the cleaner is located, in the memory location of said cleaning block.

In result, the known method has disadvantage in that there have to be provided n memory locations corresponding to the n cleaning blocks, thereby causing the memory capacity to need to unnecessarily increase.

In addition, the number of the cleaning blocks increases in proportion to the area of the cleaning region, so that the known method has another disadvantage in that the cleaning region is obliged to be limited due to the limited memory capacity.

As described above, the longitudinal and lateral distances of the cleaning region are divided by the unit distance, thus, there may be a remaining region which remains out of the divided blocks, for example, the remaining region which remains out of the 13×13 cleaning blocks of FIG. 14, said remaining region being represented at the deviant lined portion. In result, the known method has another disadvantage in that the cleaner does not travel along the remaining region so that the region can not be cleaned.

Furthermore, the known method has another disadvantage in that the cleaner can not efficiently clean the boundary regions between respective blocks as the regions are out of the cleaning effect of the cleaner.

SUMMARY OF THE INVENTION

It is, therefore, an object of this invention to provide a method for automatically controlling a travelling and cleaning operation of a vacuum cleaner in which the above disadvantages can be overcome, and in which a cleaning region is designated by using data for sectional distances of travelling paths of an outline of the cleaning region and path directions, then the cleaner is controlled by means of a control device in order to travel along the designated cleaning region in accordance with a control of the control device by using data corresponding to the cleaning region, thereby causing the cleaning region not to be limited by the memory capacity of a storage device of the control device, thus causing the cleaner to automatically perform a travelling and cleaning operation for a cleaning region regardless of dimensions of the cleaning regions.

It is another object of this invention to provide a method for automatically controlling a travelling and cleaning operation of a vacuum cleaner in which the cleaner is controlled to travel along the sequential cleaning blocks simultaneously with overlapping a predetermined width of each cleaning block, thereby improving the cleaning effect of the cleaner.

The above-mentioned objects of this invention can be accomplished by providing a method for automatically controlling a travelling and cleaning operation of a vacuum cleaner comprising: a learning travel step for calculating straight travelling distances of respective outline paths of a cleaning region and path directions of next travelling paths after a 90° turning right or left, then storing said straight travelling distances of the outline paths and said path directions of the next travelling paths after the 90° turning right or left in a storage device together with the total number of the outline paths; a two-dimensional coordinates calculating step for determining respective positions of straight division lines on the basis of 90° turning points by using data corresponding to the straight travelling distances and the path directions, each of which straight division lines parallels the x-axis or the y-axis, then calculating two-dimensional coordinates of cleaning blocks which are capable of determining positions and areas of respective cleaning blocks which are divided by said straight division lines; a cleaning block discriminating step for discriminating, on the basis of said two-dimensional coordinates of the cleaning blocks, a plurality of integrated cleaning regions each comprising a plurality of sequential cleaning blocks of which each lower end or each upper end coincides with an outline path of the cleaning region, and determining a cleaning start block and a cleaning end block of each integrated cleaning region; and a practical cleaning step for controlling said cleaner to sequentially travel along said integrated cleaning regions such that the cleaner straightly travels along a straight travelling path from each cleaning start block to each cleaning end block of each integrated cleaning region, turns in 180° turning reverse at a turning reverse position, then straightly travels from said cleaning end block to said cleaning start block simultaneously with overlapping the cleaning blocks in a predetermined overlapping value.

BRIEF DESCRIPTION OF THE DRAWINGS

The above and other objects, features and other advantages of the present invention will be more clearly understood from the following detailed description taken in conjunction with the accompanying drawings, in which:

FIGS. 1A, 1B and 1C are schematic views showing a construction of a vacuum cleaner in accordance with the present invention, respectively, in which:

FIG. 1A is a front view;

FIG, 1B is a plane view; and

Figure 1A:
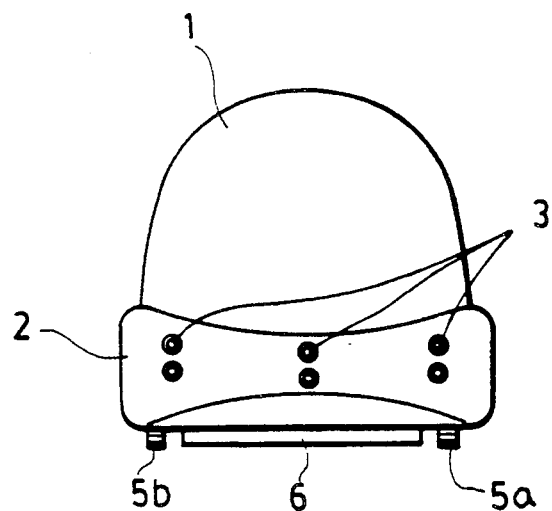
Figure 1B:
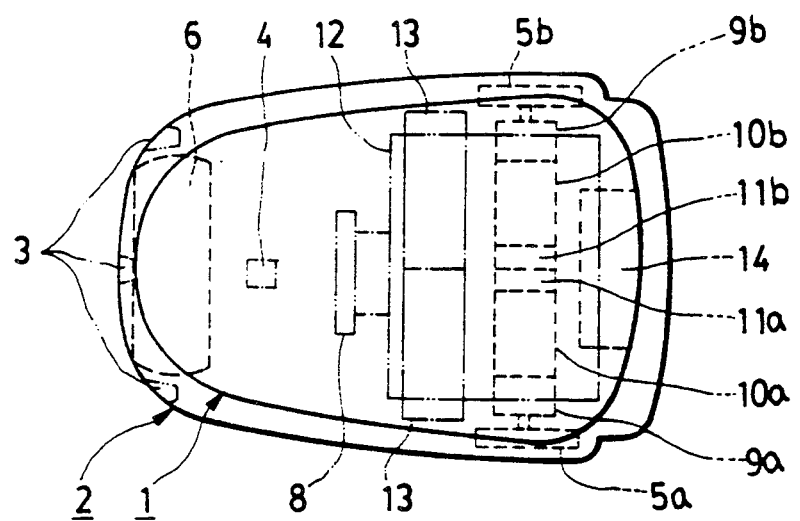
Figure 1C:
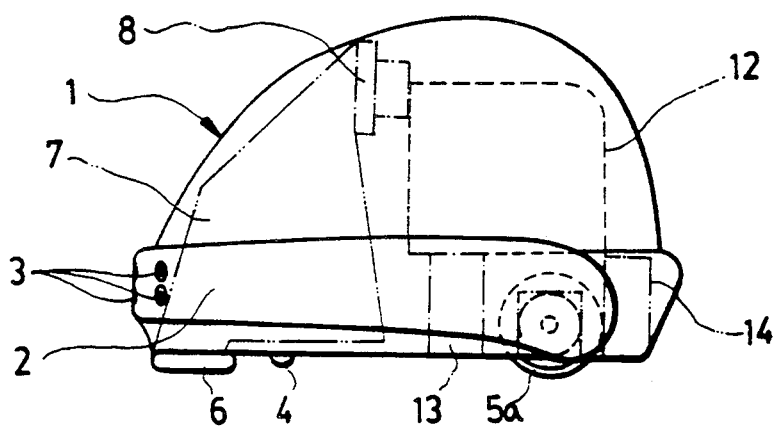
Figure 2:
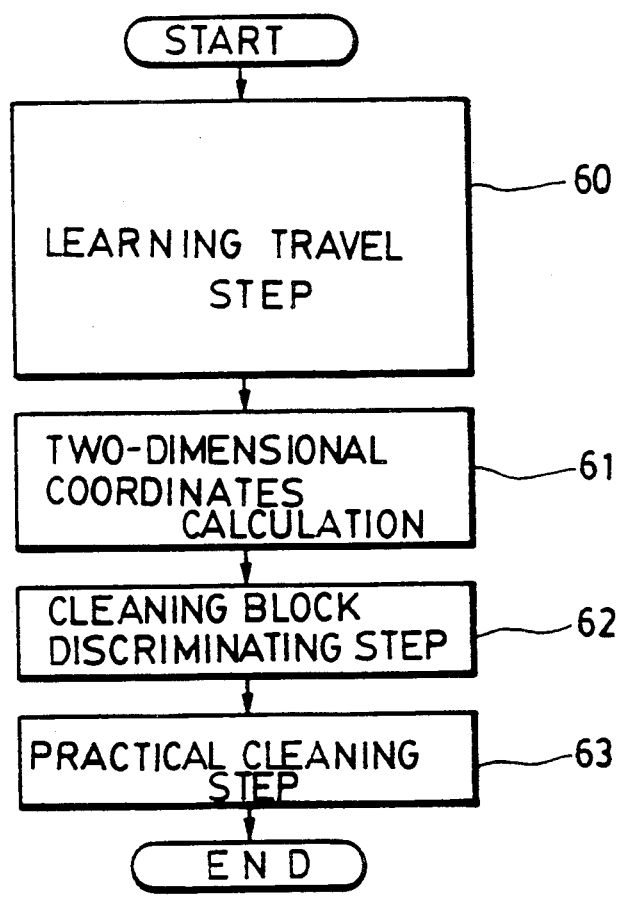
Figure 3:
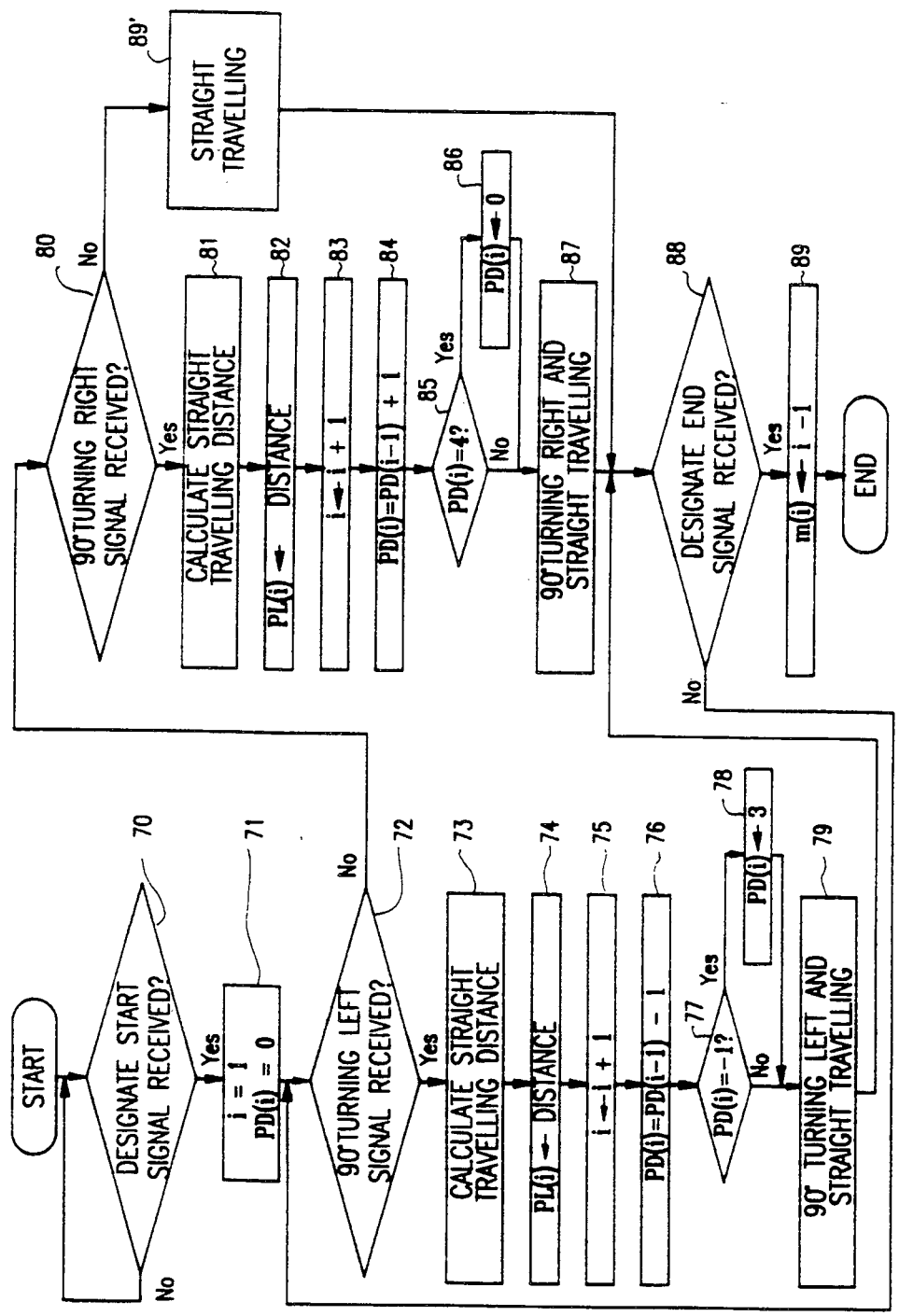
Figure 4:
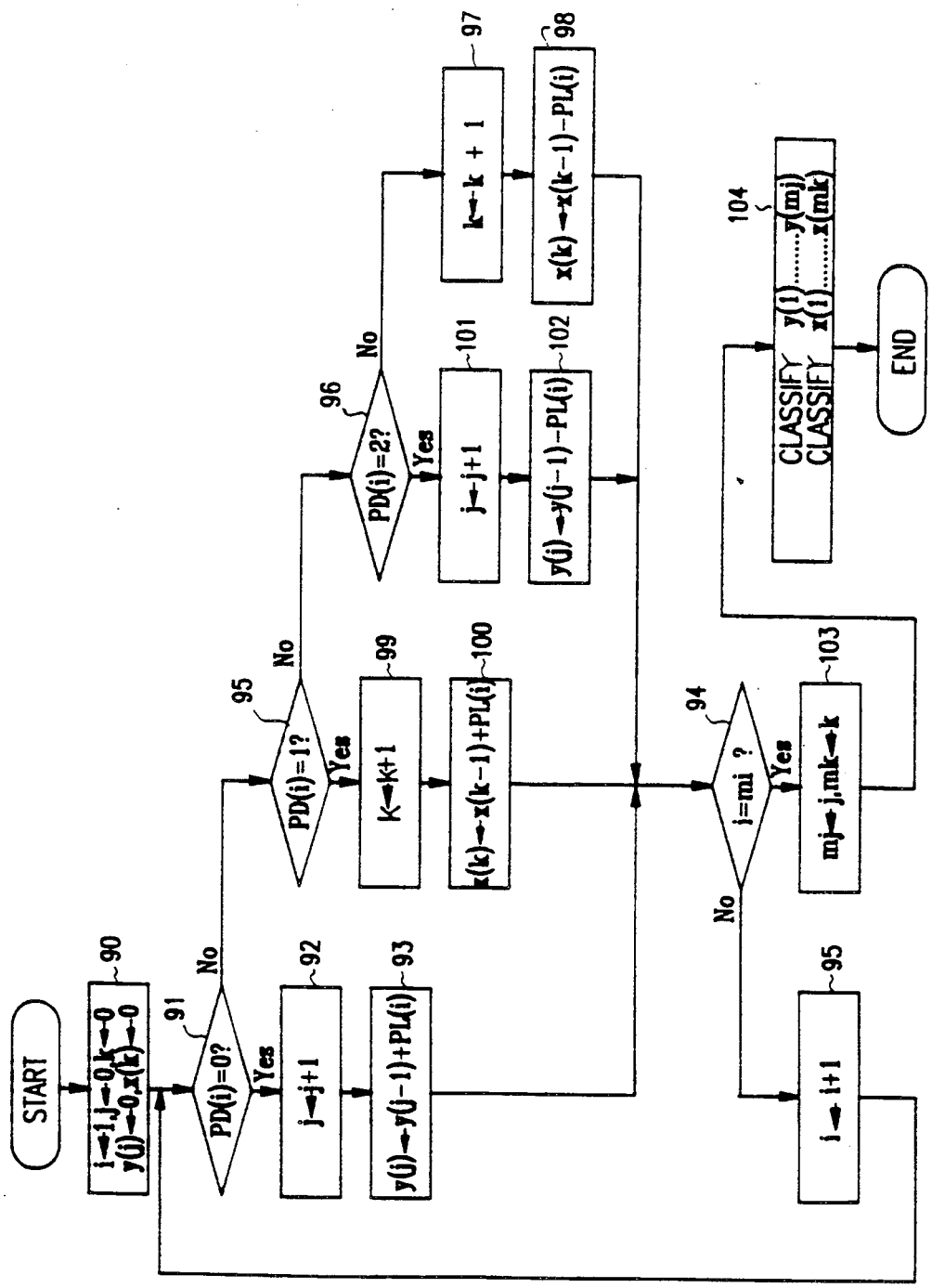
Figure 5:
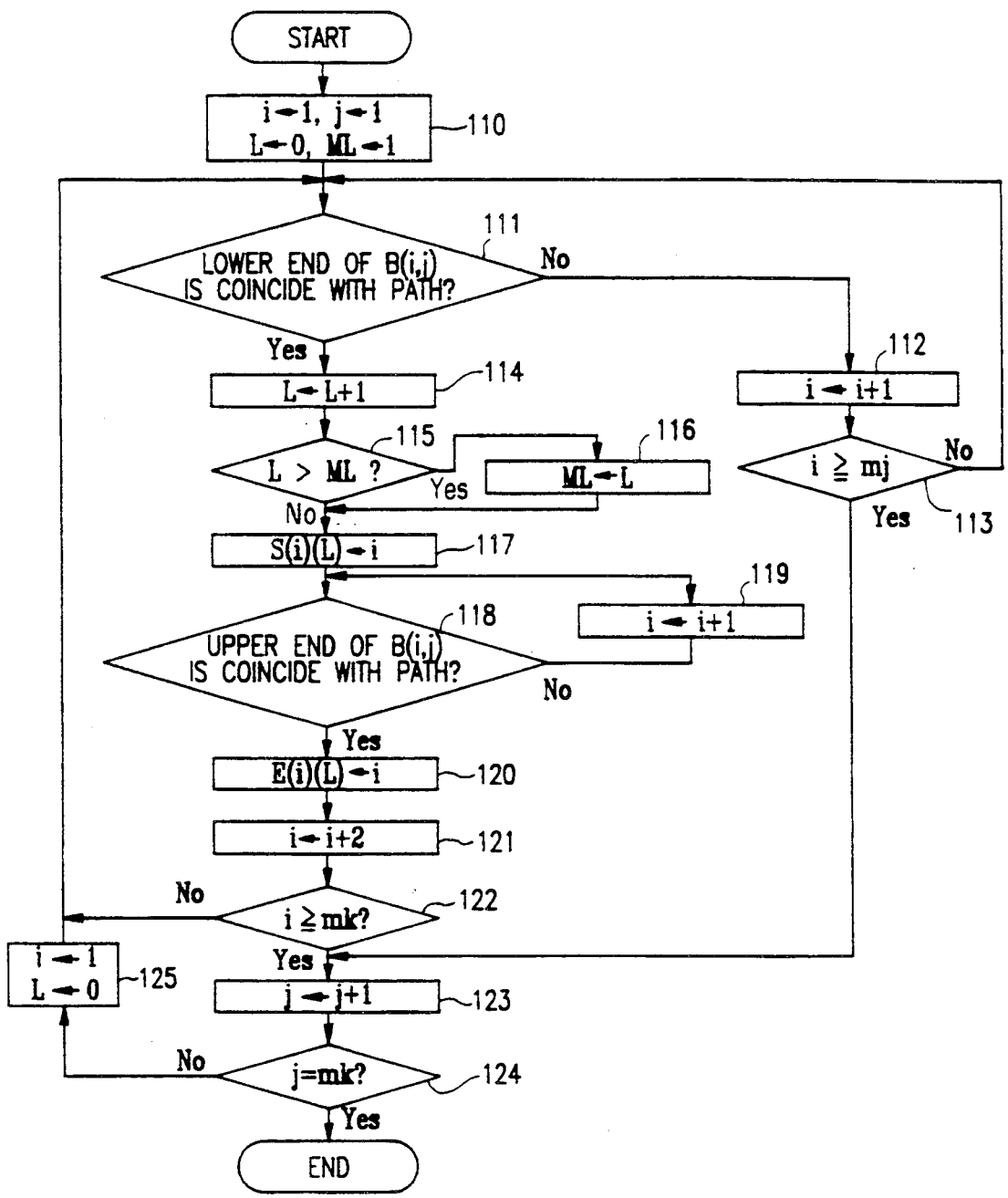
Figure 6:
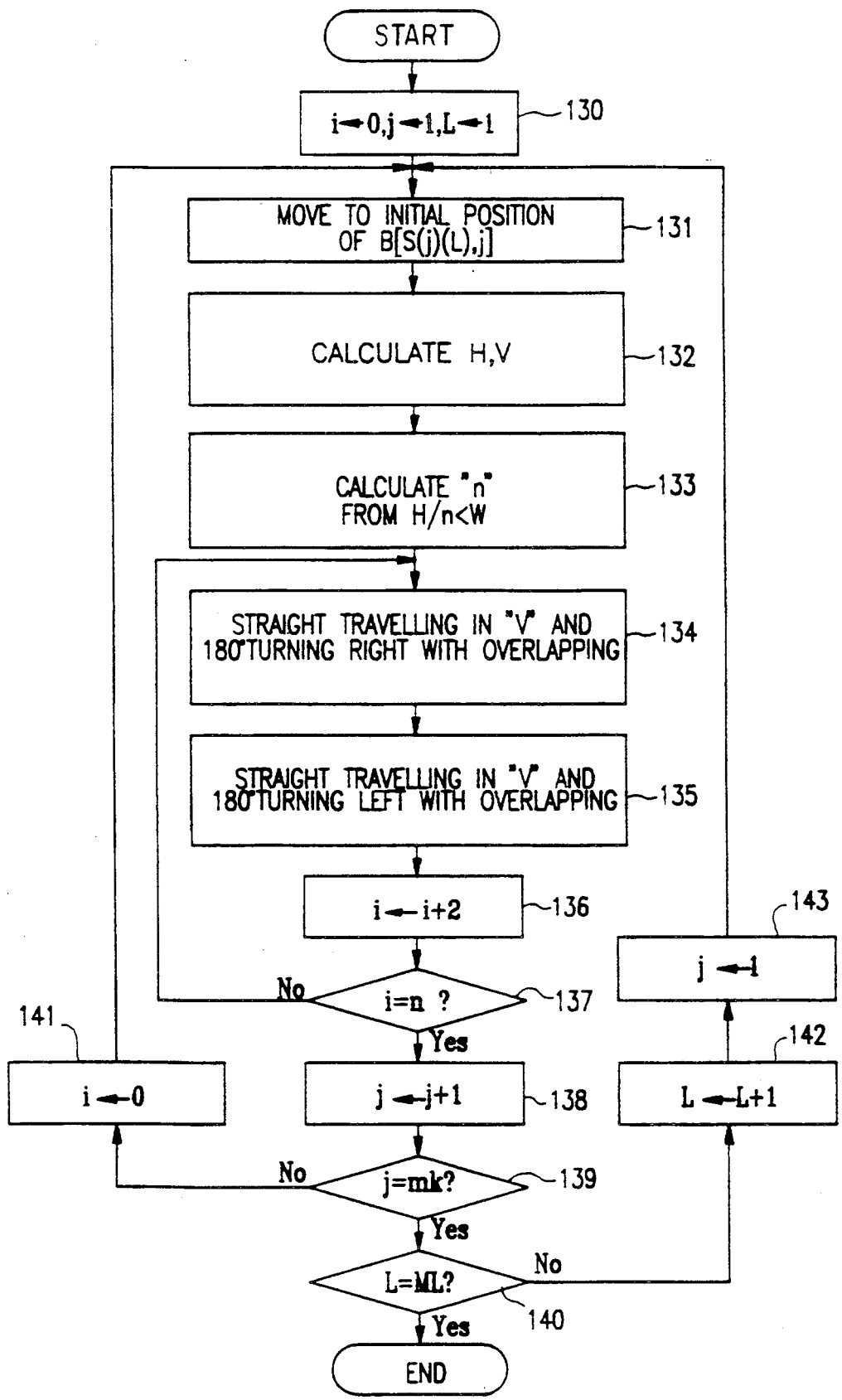
Figures 7A, 7B, 7C:
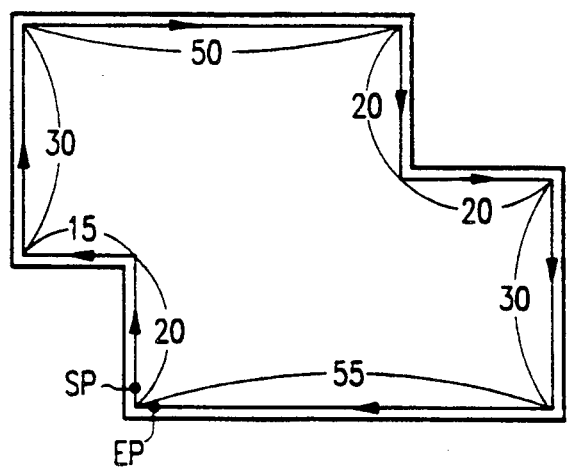

FIG. 1C is a side view;

FIG. 2 is a flowchart showing a process for automatically controlling a travelling and cleaning operation of the cleaner of FIGS. 1A to 1C;

FIG. 3 is a flowchart showing a process for performing a learning travel step of FIG. 2;

FIG. 4 is a flowchart showing a process for performing a two-dimensional coordinates calculating step of FIG. 2;

FIG. 5 is a flowchart showing a process for performing a cleaning block discriminating step of FIG. 2;

FIG. 6 is a flowchart showing a process for performing a practical cleaning step of FIG. 2;

FIGS. 7A to 7C are views showing an example of the learning travel step of FIG. 3, in which:

FIG. 7A is a schematic plane view showing a cleaning region and travelling paths;

FIG. 7B is a table showing explanations for respective variables; and

Figures 8A, 8B, 8C, 8D:
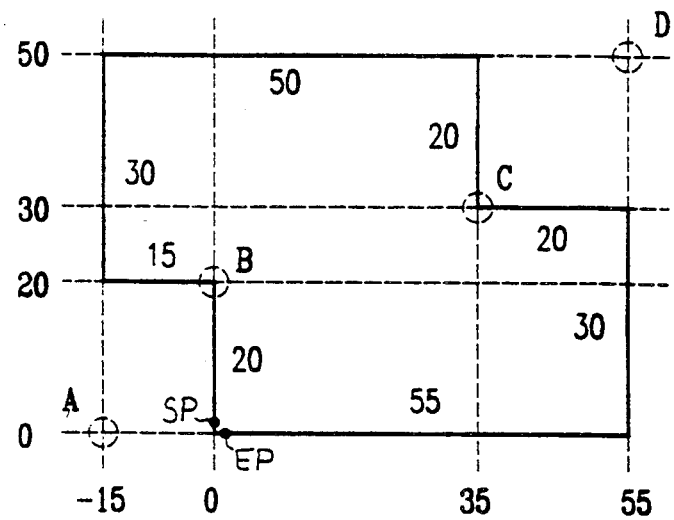

FIG. 7C is a table showing results of the learn travel step;

FIGS. 8A to 8D are views showing an example of the two-dimensional coordinates calculating step of FIG. 4, respectively, in which:

FIG. 8A is a plane view of a coordinate system of the cleaning region;

FIG. 8B is a table showing explanations for respective variables; and

FIGS. 8C and 8D are tables showing results of the two-dimensional coordinates calculating step;

FIGS. 9A to 9E are views showing an example of the cleaning block discriminating step of FIG. 5, respectively, in which:

FIG. 9A is a plane view of cleaning blocks of the cleaning region;

FIG. 9B is a table showing explanations for respective variables;

FIG. 9C is a table showing results of the cleaning block discriminating step;

FIG. 9D is a plane view of cleaning blocks of another type of cleaning region; and FIG. 9E is a table showing results of the cleaning block discriminating step for cleaning blocks of FIG. 9D.

Figure 10:
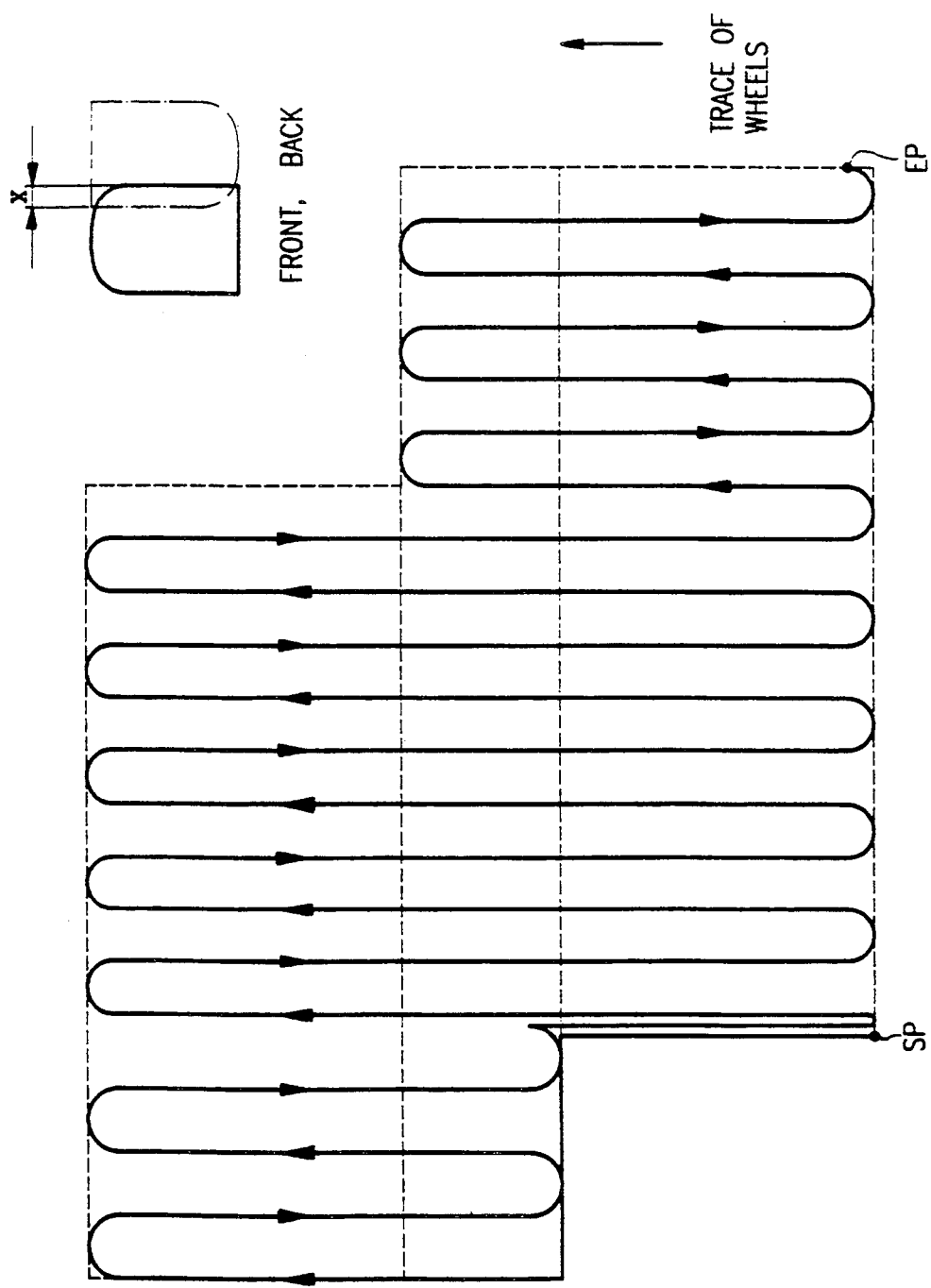
Figure 11:
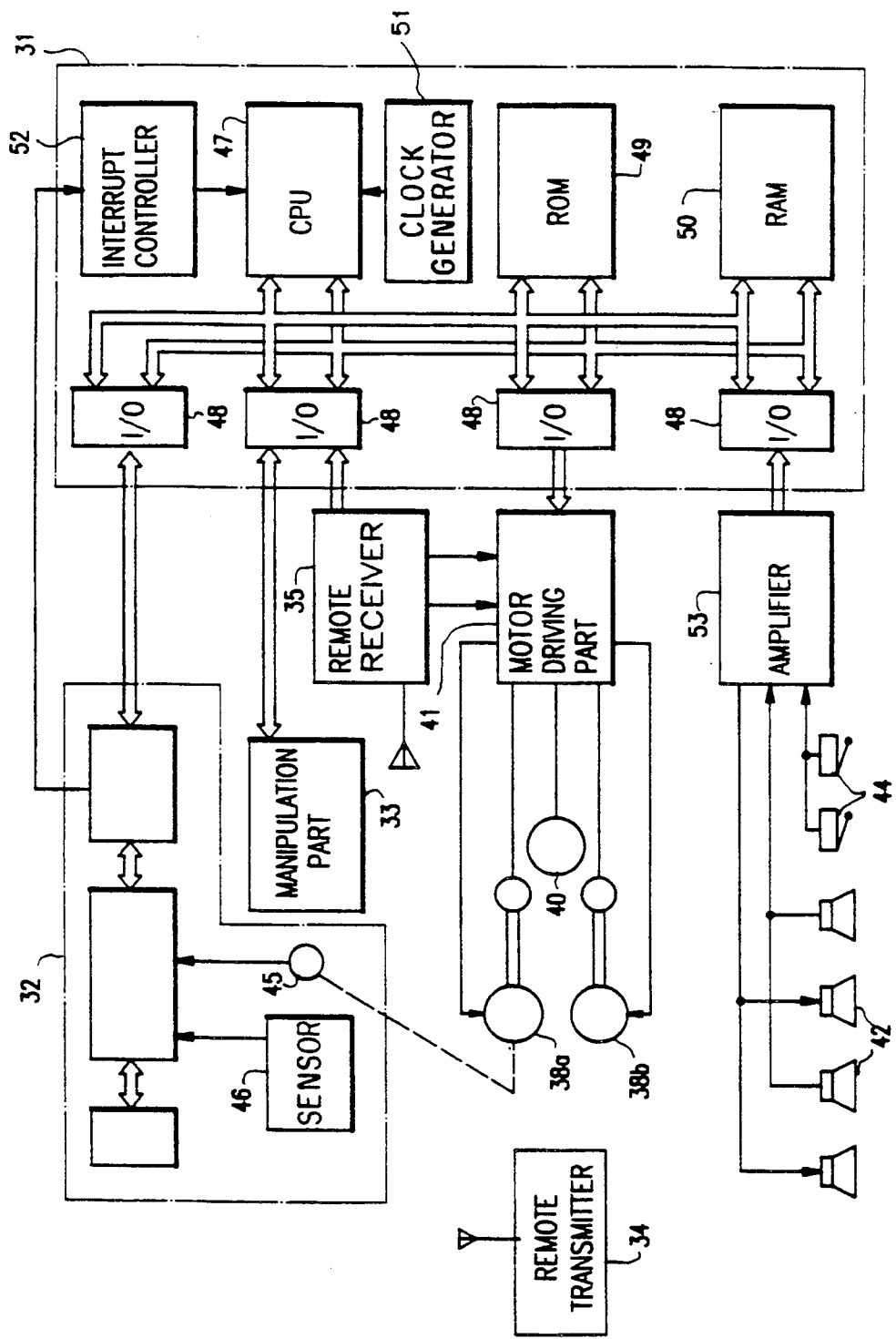
Figure 12:
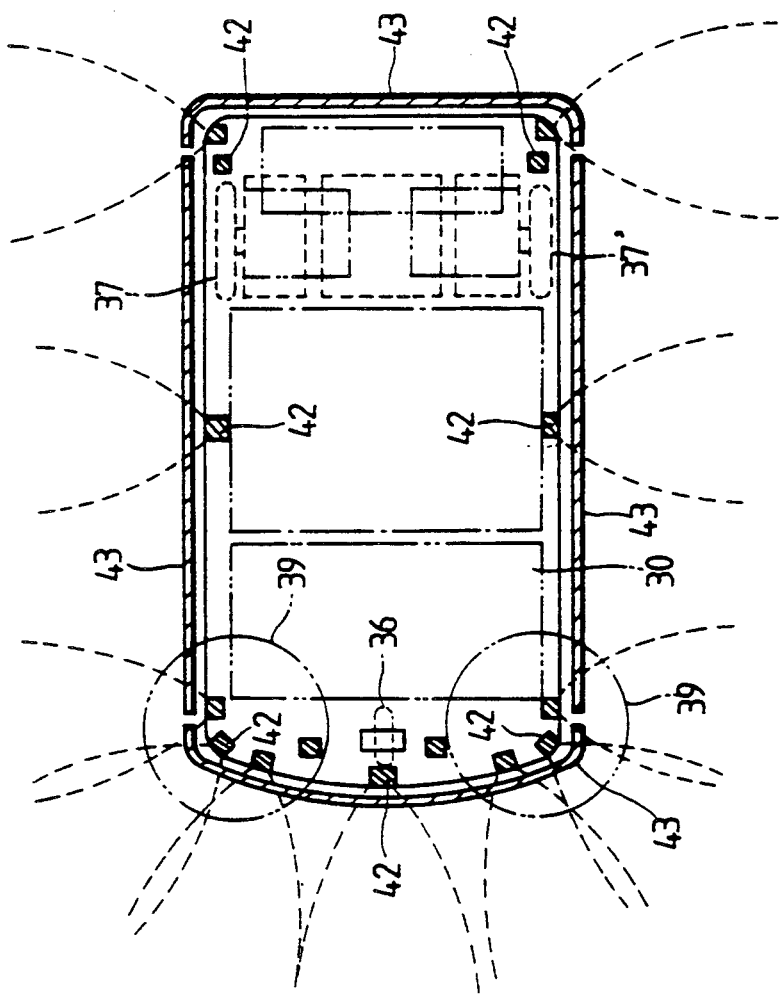
Figure 13:
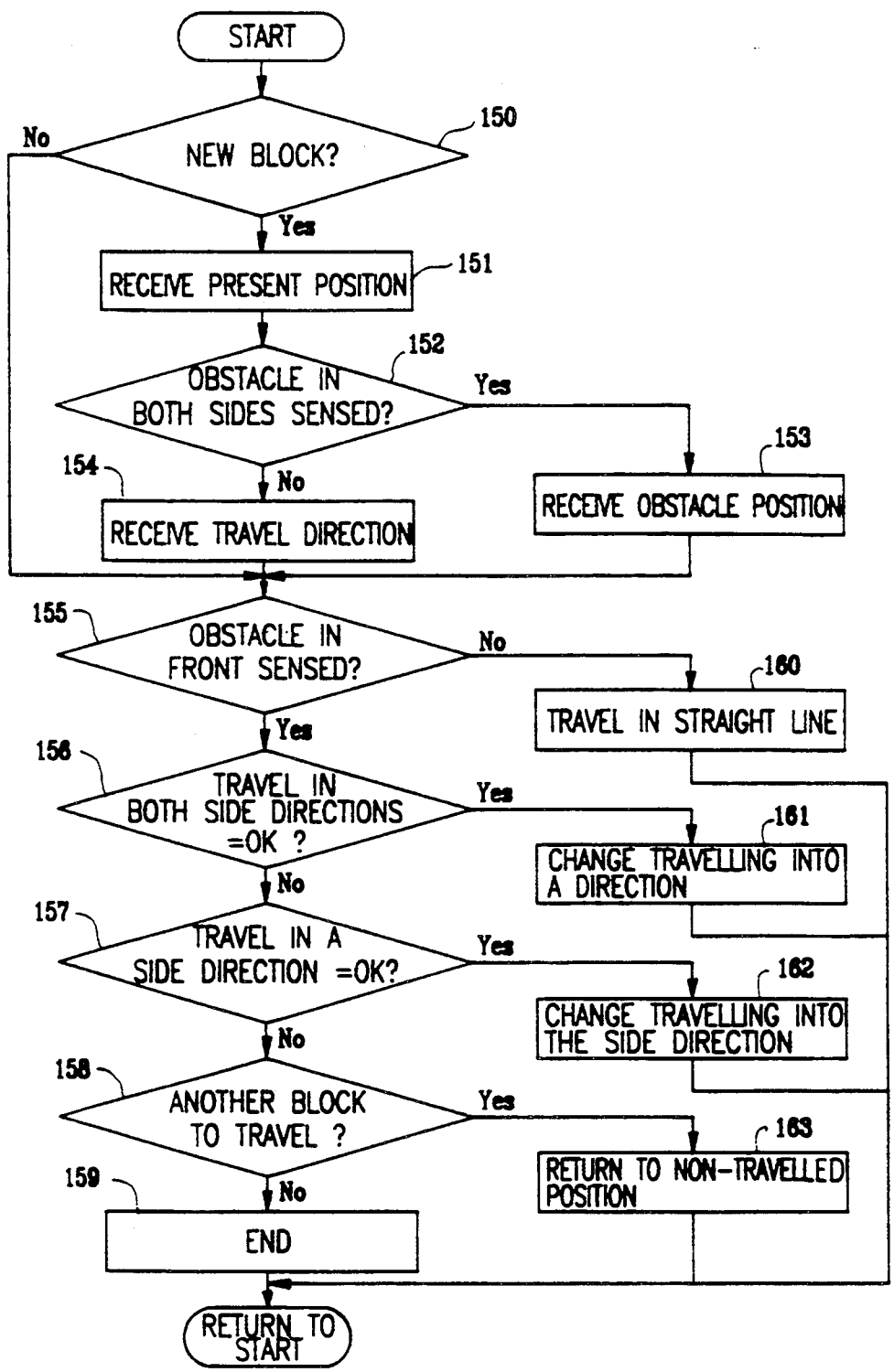
Figure 14:
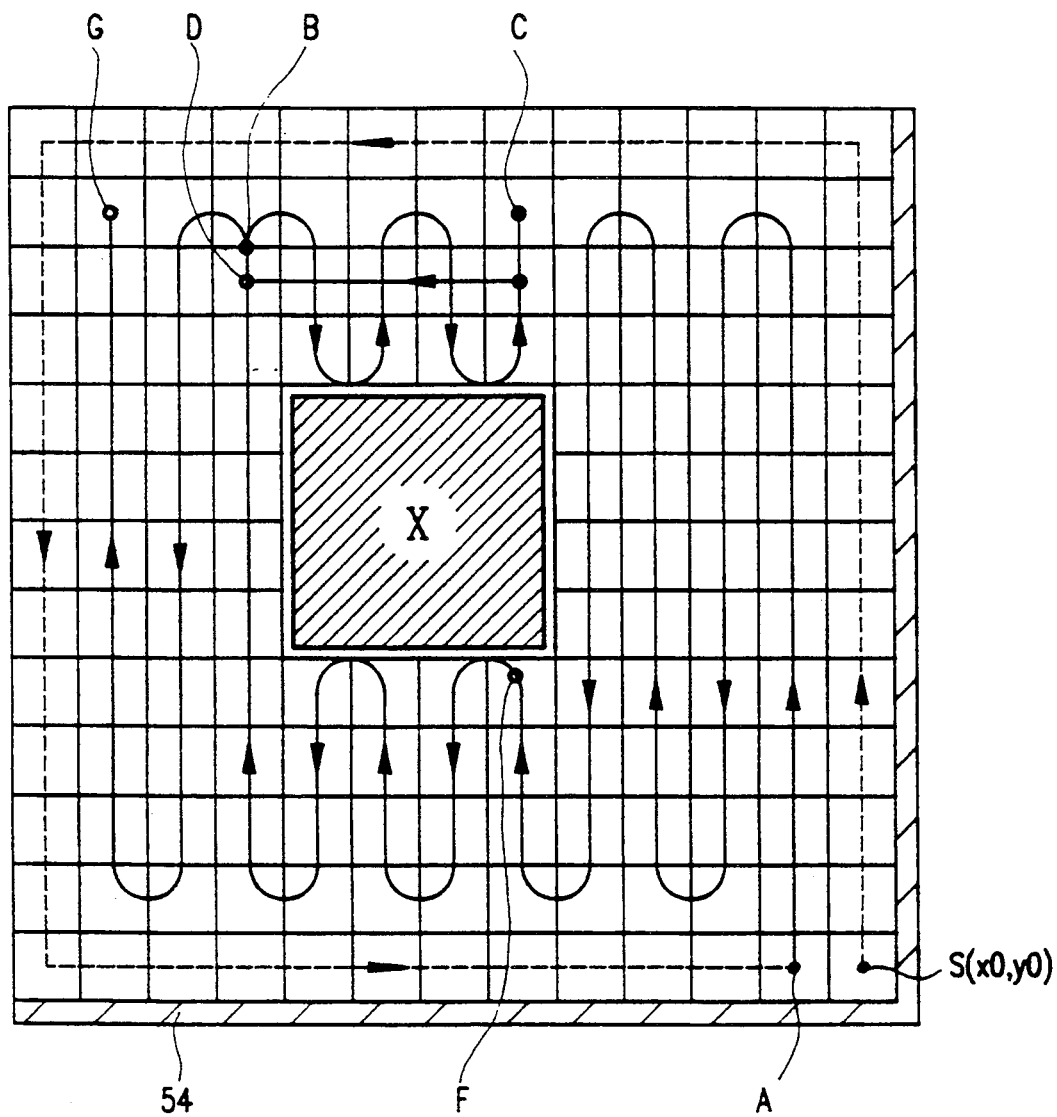

FIG. 10 is a schematic view showing the trace of wheels of the cleaner resulting from the travelling and cleaning operation performed by the process of FIG. 6;

FIG. 11 is a block diagram showing a construction of a known vacuum cleaner;

FIG. 12 is a schematic plane view showing a construction of the known cleaner of FIG. 11;

FIG. 13 is a flowchart showing a process for controlling the known cleaner of FIG. 11; and FIG. 14 is a schematic view showing the trace of wheels of the known cleaner resulting from a travelling operation performed by the process of FIG. 13.

DETAILED DESCRIPTION OF THE PREFERRED EMBODIMENTS

Referring now to FIGS. 1A to 1C which are a front view, a plane view and a side view of a vacuum cleaner in accordance with the present invention, respectively, the cleaner comprises a main body 1 which is encircled by a bumper 2. The bumper 2 is provided with a plurality of obstacle sensors 3 mounted thereon in order to sense an obstacle in a travelling path by transmitting and receiving an ultrasonic wave signal.

In addition, the cleaner is provided with a front wheel 4 and a pair of rear wheels 5a and 5b mounted under a front portion and both side portions of the main body 1. The main body 1 is equipped in a front portion thereof with a dust suction part 6, a dust suction chamber 7 and a suction motor 8. The rear wheels 5a and 5b are connected to reduction gears 9a and 9b, a pair of reversible driving motors 10a and 10b and a pair of distance sensors 11a and 11b for sensing travelling distance of the cleaner on the basis of revolutions of the rear wheels 5a and 5b.

The main body 1 is provided with a control device 12 for performing the automatic control for the travelling and cleaning operation of the cleaner. The control device 12 has the same construction as that of the control circuit 31 of the above-mentioned known cleaner of FIG. 11. Additionally, the main body 1 of the cleaner is provided therein with a pair of electric power sources for supplying electric power for the suction motor 8, the reversible wheel driving motors 10a and 10b and the control device 12.

Turning next to FIG. 2 which is a flowchart showing a main process for automatically controlling the travelling and cleaning operation of the cleaner of FIGS. 1A to 1C, the cleaner first travels along outline paths of the cleaning region from a start position to an end position under a remote control by virtue of a remote controller, thereby accomplishing a designation for the cleaning region which is to be cleaned by the cleaner. At this time, the cleaner is controlled to travel along the outline of the cleaning region by travelling along a plurality of straight travelling paths, and turning at 90° turning right positions and at 90° turning left positions. In other words, upon receiving a 90° turning left or right control signal from the remote controller during travelling along a straight travelling path starting from the start position SP, the cleaner turns in 90° turning right or 90° turning left, then travels along another straight travelling path. In the same manner, the cleaner is controlled by means of the remote-controller to travel along the remaining outline paths of the cleaning region until the cleaner reaches the end position EP, thereby accomplishing the whole travelling along the outline paths of the cleaning region.

As shown in FIG. 2, the main process for automatically controlling the travelling and cleaning operation of the cleaner comprises a learning travel step 60, a two-dimensional coordinates calculating step 61, a cleaning block discriminating step 62 and a practical cleaning step 63.

In the learning travel step 60, the control device 12 calculates straight travelling distances PL(i) of respective outline paths of the cleaning region and path directions PD(i) of the next travelling paths after the 90° turning right or left, then stores the straight travelling distances PL(i) of the outline paths and respective path directions PD(i) of the next travelling paths after the 90° turning right or left in a RAM thereof together with the total number mi of the outline paths.

In the two-dimensional coordinates calculating step 61, the control device 12 determines respective positions of straight lines on the basis of the 90° turning points by using data corresponding to the straight travelling distances PL(i) and the path directions PD(i), each of which straight lines parallels the x-axis or the y-axis, then calculates two-dimensional coordinates x(k), y(j), the total line number "mk" of longitudinal division lines and the total line number "mj" of lateral division lines of the cleaning blocks, said two-dimensional coordinates x(k), y(j) being capable of determining positions and areas of respective cleaning blocks B(i,j) of the cleaning region.

Additionally, in the cleaning block discriminating step 62, the control device 12 delimits, on the basis of the two-dimensional coordinates x(k), y(j) of the cleaning blocks B(i,j), a plurality of integrated cleaning regions each comprising a plurality of sequential cleaning blocks disposed between a cleaning block S(j)(L), that is, a cleaning start block of which the lower end coincides with an outline path of the cleaning region to another cleaning block E(j)(L), that is, a cleaning end block of which upper end coincides with an outline path of the cleaning region, then determines the cleaning start block S(j)(L) and the cleaning end block E(j)(L).

In the practical cleaning step 63, the control device 12 divides the lateral distances of the integrated cleaning regions by any even number "n" in order to calculate a minimum even number "n" which is shorter than the width "W" of the cleaner, then calculates an overlapping value $X=(W-1/n)$ on the basis of the minimum even number "n", thereafter controls the cleaner to travel along the straight travelling paths and turn at the turning positions simultaneously with overlapping the cleaning blocks in the overlapping value $X=(W-1/n)$, thereby making the cleaner sequentially travel along the whole integrated cleaning regions in order to efficiently clean the integrated cleaning regions.

The above respective steps 60 to 63 will be described in detail in conjunction with flowcharts and examples each shown in FIGS. 3 to 10, as follows.

As shown in FIGS. 3 and 7 which are a flowchart showing a process for performing the learning travel step 60 of FIG. 2 and views showing an example of the learning travel step 60 of FIG. 3, the user controls the cleaner to locate at the start position SP by using a remote controller, then starts the cleaner after having selected the learning travel mode of the cleaner (step 70). In result, the control device 12 controls the wheel driving motors 10a and 10b to drive the wheels 5a and 5b, thereby causing the cleaner to travel along a first straight path of the cleaning region from the start position SP. At this time, the distance sensors 11a and 11b sense the travelling distance of the cleaner as the cleaner travels, then output electric signals corresponding to the travelling distance to the control device 12.

At this time, upon receiving the distance signals from the distance sensors 11a and 11b, the control device 12 processes the signals in the same manner as that of the known control circuit 31 of FIG. 11.

At initial travelling operation of the cleaner, the cleaner travels along the first travelling path which is a straight travelling path so that the path number (i) of the travelling path is set as "1" and the path direction [PD(i)=PD(1)] is set as "0" (step 71).

Upon receiving a 90° turning left signal after accomplishing the travelling along the first straight travelling path in a predetermined distance PL(1) (step 72), the control device 12 stores the straight travelling distance PL(1) along the first travelling path in the RAM thereof, said distance PL(1) resulting from the processing thereof for the input signals applied from the distance sensors 11a and 11b thereto (steps 73 and 74).

As shown in FIG. 7A, the straight travelling distance in the first travelling path is "20", the control device 12 stores in the RAM the straight travelling distance PL(1)=20 in which the cleaner has travelled along the first travelling path.

Thereafter, the control device 12 increases the path number(i) by adding "1", thereby setting the path number(i) as "2" (step 75), then calculates the path direction PD(i) of this travelling path, that is, a second travelling path by using a formula PD(i)=PD(i−1)−1 (step 76). At this time, the path number (i) is "2" as described above, so that if "2" is substituted for "i", the above formula will be described as follows: PD(2)=PD(2−1)−1=PD(1)−1, wherein the path direction in the first travelling path PD(1) is "0" as described above. In result; the path direction PD(2) in the second travelling path is calculated as "−1", that is, PD(2)= −1, Thereafter, the control device 12 determines whether the path direction PD(i) is "−1" (step 77). At this time, the path direction PD(2) in the second travelling path is "−1" as described above, thus, the control device 12 substitutes "3" for the path direction PD(2) (step 78), then controls the cleaner to turn in 90° turning left, thereafter, sequentially controls the cleaner to travel along the second straight path (step 79).

However at the step 77, if the path direction PD(i) is not "−1", the path direction PD(i) is not substituted by "3" and the control device 12 simply performs the step 79 in order to control the cleaner to turn in 90° turning left, thereafter, sequentially travel along the second straight path.

Thereafter, upon receiving a 90° turning right signal after accomplishing the travelling along the second straight travelling path in a predetermined distance PL(2) (step 80), the control device 12 stores the straight travelling distance PL(2) in the second travelling path in the RAM thereof, said distance PL(2) resulting from the processing thereof for input signals applied from the distance sensors 11a and 11b thereto (steps 81 and 82).

As shown in FIG. 7A, the straight travelling distance in the second travelling path is "15", thus, the control device 12 stores in the RAM thereof the straight travelling distance PL(2)=15 in which the cleaner has travelled along the second travelling path. Thereafter, the control device 12 increases the path number(i) by adding "1", thereby setting the path number (i)="3" (step 83), then calculates the path direction PD(i) of the third straight travelling path by using a formula PD(i)=PD(i−1)+1 (step 84). In this case, "3" is substituted for "i", the formula is described as follows: PD(3)=PD(3−1)+1=PD(2)+1. Here, the path direction PD(2) in the second travelling path is "3", resulting from the above-described substitution, so that the path direction PD(3) in the third straight travelling path is determined as "4" resulting from PD(2)+1=3+1.

Sequentially, the control device 12 determines whether the path direction PD(i) is "4" (step 85). At this time, the path direction PD(3) in the third straight travelling path is "4" as described above, thus, the control device 12 substitutes "0" for the path direction PD(3) (step 86), then controls the cleaner to turn in 90° turning right, thereafter, sequentially controls the cleaner to travel along the third straight travelling path (step 87).

Thereafter, upon receiving a 90° turning right signal after accomplishing the travelling along the third straight travelling path (i=3) in a predetermined distance PL(3), the control device 12 again performs the steps 80 to 87. That is, the control device 12 stores the straight travelling path (i=3) in a predetermined dispath in the RAM thereof, said distance PL(3) resulting from the processing thereof for input signals applied from the distance sensors 11a and 11b thereto (steps 81 and 82).

As shown in FIG. 7A, the straight travelling distance in the third travelling path is "30", the control device 12 stores in the RAM the straight travelling distance PL(3)=30 in which the cleaner has travelled along the third travelling path.

Thereafter, the control device 12 increases the path number(i) by adding "1", thereby setting the path number (i)="4" (step 83), then calculates the path direction PD(i) of a fourth straight travelling path by using the formula PD(i)=PD(i−1)+1 (step 84). In this case, "4" is substituted for "i", the formula is described as follows: PD(4)=PD(4−1)+1=PD(3)+1. Here, the path direction PD(3) in the second travelling path is "0", resulting from the above-described substitution, so that the path direction PD(4) in the fourth straight travelling path is determined as "1".

Thereafter, the control device 12 determines whether the path direction PD(i) is "4" (step 85). At this time, the path direction PD(4) in the fourth straight travelling path was determined as "1" as described above, thus, the control device 12 simply performs the step 87 without any substitution in order to control the cleaner to turn in 90° turning right, thereafter, sequentially travel along the fourth straight travelling path (step 87). At this time, the path direction PD(4) in the fourth straight travelling path is set as "1".

In the same manner as described above, with increasing "i" by adding "1" at a time, the control device 12 calculates respective path directions PD(i) and straight travelling distance PL(i) for respective straight travelling paths, that is, the first to eight straight travelling paths as shown in FIG. 7A. The calculated path directions PD(i) and the straight travelling distances PL(i) for respective straight travelling paths are described in a table of FIG. 7D.

Thereafter, as the cleaner reaches the end position EP, the control device 12 receives a 90° turning right signal and the learning travel end signal (step 88), then calculates the total number "mi" of the straight travelling paths by using a formula mi=i−1 (step 89). Here, "i" is 9, so that the formula will be described as m9=9−1=8. In result, the total number, "mi" of the straight travelling paths is calculated as "8". Thereafter, the control device 12 ends the learning travel step 60.

Turning next to FIGS. 4 to 8, FIG. 4 is a flowchart showing a process for performing the two-dimensional coordinates calculating step el of FIG. 2, FIGS. 8A to 8D are views showing an example of the two-dimensional coordinates calculating step of FIG. 4, respectively.

As shown in FIGS. 4 and 8A, in which FIG. 8A is a plane view of a coordinate system of the cleaning region, the control device 12 in the two-dimensional coordinates calculating step 61 first sets initial conditions of x(k)=0, y(j)=0, i=1, j=0 and k=0 with respect to a x-coordinate x(k) for a k-th longitudinal division line of the divided cleaning blocks and also a y-coordinate y(j) for a j-th lateral division line of the divided cleaning blocks (step 90), then determines the path direction PD(1) of the first travelling path (i=1) (step 91). At this time, the first path direction PD(1) is determined as "0", representing a straight travelling. Thus, the control device 12 increases the "j" value by adding "1", that is, j=1, then calculates the y-coordinate y(j) by using a formula y(j)=y(j−1)+PL(j) (step 93). If the "j" value is substituted by "1", the formula is mm described as follows: y(1)=y(1−1)+PL(1)=20.

Thereafter, the control device 12 compares the present travelling path (i=1), along which path the cleaner travels, with the total number (mi=8) of the total travelling paths in o order to determine whether the number (i=1) of the present path is equal to the total number (mi=8) of the travelling paths (step 94). At this time, because the number (i=1) of the present path is not equal to the total number (mi=8) of the travelling paths, the control device 12 increases the "i" value by adding "1" (step 95), that is, i=2. Thereafter, the control device 12 performs the step 91 in order to determine the path direction PD(2) in the second travelling path (i=2).

At this time, the path direction PD(2) has been calculated as "3" (representing the 90° turning left) as described above, the control device 12 performs steps 95 to 97 in order to increases the "k" value by adding "1", that is, k=1. Thereafter, the control device 12 calculates the x-coordinate x(k) for the k-th longitudinal division line of the divided cleaning blocks by using a formula x(k)=x(k−1)-PL(i), wherein the "k" value is "1" and "i" value is "2" as described above. In result, the above formula for the x-coordinate x(k) will be described as follows: x(1)=x(1−1)- PL(2)=−15.

Thereafter, the control device 12 repeatedly performs the above-mentioned steps from the step 94 wherein it is determined whether the number (i=1) of the present path is equal to the total number (mi=8) of the travelling paths.

Here, at the steps 91, 95 and 96 wherein it is determined whether the path direction PD(i) of i-th travelling path is "0" (representing the straight travelling), "1" (representing the 90° turning right) or "2" (representing the 180° reverse turning), if it is determined that the path direction PD(i) of i-th travelling path is "1" (representing the 90° turning right) or "3" (representing the 90° turning left), the control device 12 performs the step 99 or 97 in order to increases the "k" value by adding "1", then performs the step 100 or 98 in order to calculate the x-coordinate x(k) for the k-th longitudinal division line of the divided cleaning blocks by using the formula x(k)=x(k−1)+PL(i) or x(k)=x(k−1)−PL(i).

Sequentially, the control device 12 performs the step 94 wherein it is determined whether the number (i) of the present path is equal to the total number (mi=8) of the travelling paths.

On the contrary, at the steps 91, 95 and 96, if it is determined that the path direction PD(i) of i-th travelling path is "2" (representing the reverse turning) or "0" (representing the straight travelling), the control device 12 performs step 101 or 92 in order to increases the "j"

value by adding "1", then performs the step 102 or 93 in order to calculate the y-coordinate y(j) for the j-th lateral division line of the divided cleaning blocks by using the formula y(j) =y(j−1)−PL(i) or y(j-)=y(j−1)+PL(i). Sequentially, the control device 12 performs the step 94 wherein it is determined whether the number (i) of the present path is equal to the total number (mi=8) of the travelling paths.

In the same manner, the control device 12 calculates two-dimensional coordinates for eight travelling paths. The calculated two-dimensional coordinates, that is, x-coordinates and y-coordinates of longitudinal division lines and lateral division lines of the cleaning blocks are described in a table of FIG. 8C. In addition, the total number mj of the lateral division lines of the cleaning blocks is "4", that is, mj=4, while the total number mk of the longitudinal division lines of the cleaning blocks is "4", that is, mk=4, as shown in FIG. 8C.

Thereafter, the x-coordinates and y-coordinates of longitudinal division lines and lateral division lines of the cleaning blocks are sequentially classified according to the magnitude thereof, that is, in an order from the relatively smaller value of coordinate to the relatively larger value of each coordinate (step 104). The classified x-coordinates and y-coordinates are described in a table of FIG. 8D. In result, the control device 12 calculates two-dimensional coordinates of cross points of the lateral division lines and the longitudinal division lines of the cleaning blocks.

For example, the two-dimensional coordinate of the A cross point of FIG. 8A is determined such that the x-coordinate thereof which is disposed at the first longitudinal division line (from a coordinate of −15 to another coordinate of 55) is determined as x(1)=−15, and the y-coordinate thereof which is disposed at the first lateral division line (from a coordinate of 0 to another coordinate of 50) is determined as y(1)=0. In result, the two-dimensional coordinate of the A cross point of FIG. 8A is described as A(−15,0).

In addition, the two-dimensional coordinate of the B cross point of FIG. 8A is determined such that the x-coordinate thereof which is disposed at the second longitudinal division line is determined as x(2)=0, and the y-coordinate thereof which is disposed at the second lateral division line is determined as y(2)=20. In result, the two-dimensional coordinate of the B cross point of FIG. 8A is described as B(0,20).

In the same manner, the two-dimensional coordinate of the C cross point of FIG. 8A is described as C(35,30) and the two-dimensional coordinate of the D cross point of FIG. 8A is described as D(0,20).

Accordingly, the cleaning region of FIG. 8A is divided into nine cleaning blocks in total. however, by means of the two-dimensional coordinates, seven cleaning blocks of the nine blocks are to be cleaned by the cleaner.

Turning next to FIGS. 5 to 9, in which FIG. 5 is a flowchart showing a process for performing the cleaning block discriminating step 62 of FIG. 2, and FIGS. 9A to 9E are Views showing an example of the cleaning block discriminating step 62 of FIG. 5, respectively.

As shown in FIG. 9A which is a plane view of the cleaning blocks of the cleaning region, there are nine cleaning blocks B(i,j) which are divided by i-th column and j-th row. At this time, if a plurality of cleaning blocks disposed in a L-th layer of the j-th row are discriminated as an integrated cleaning region, it is possible to calculate the column number S(i)(L) of a cleaning start block of the integrated cleaning region and the column number E(i)(L) of a cleaning end block the integrated cleaning region, as shown in FIGS. 9B and 9C.

For example, if the cleaning blocks B(1,2), B(2,2), B(3,2) disposed in a first layer (L=1) and a second row (j=2) are discriminated as an integrated cleaning region, the cleaning start block is the cleaning block B(1,2) disposed in the first column and the cleaning end block is the cleaning block B(3,2) disposed in the third column so that the column number S(i)(L) of the cleaning start block is described as S(2),(1)=1, and the column number E(i)(L) of the cleaning end block is described as E(2),(1)=3.

In the same manner, the process for calculating the column number S(i)(L) of the cleaning start block and the column number E(i)(L) of the cleaning end block is performed for respective cleaning blocks B(i,j).

The process for calculating the column number S(i)(L) of the cleaning start block and the column number E(i)(L) of the cleaning end block will be described in detail in conjunction with the flowchart of FIG. 5.

As shown in the flowchart of FIG. 5, upon setting initial conditions of i=1, j=1, L=0 and ML=1 for the layer number L and the maximum layer number ML and the like (step 110), the control device 12 determines whether the lower end of the cleaning block B(1,1) of the first column and the first row is coincide with the travelling path of the cleaning region which has been determined in the above leaning travel step (step 111).

At this time, the lower end of the cleaning block B(1,1) is not coincide with the travelling path of the cleaning region as shown in FIG. 9A, the control device 12 increases the "i" value by adding "1" ( step 112 ), then, compares the "i" value with the total number mj=4 of the lateral division lines in order to determine whether the "i" value is larger than or equal to the total number mj=4 (step 113). At this time, the "i" value (i=2) is smaller than the total number mj=4, thus, the control device 12 again performs the step 111 in order to determine whether the lower end of the cleaning block B(2,1) of the second column and the first row is coincide with the travelling path of the cleaning region which has been determined in the above leaning travel step.

Here, the lower end of the cleaning block B(2,1) is coincide with the travelling path of the cleaning region as shown in FIG. 9A, the control device 12 increases the layer number "L" by adding "1" (step 114), then, compares the layer number "L" with the maximum layer number ML in order to determine whether the layer number "L" is larger than the maximum layer number ML (step 115). At this time, the layer number "L" has been increased by adding "1", that is, L=1, the maximum layer number ML has been set as "1", that is, ML1. In result, it is determined that the "L" value is equal to the maximum layer number ML. Therefore, the column number S(i)(L) of the cleaning start block B(2,1) of the second column and the first row is described as S(1)(1)=2 (step 117).

Thereafter, the control device determines whether the upper end of the cleaning block B(2,1) of the second column and the first row is coincide with the travelling path of the cleaning region Which has been determined in the above leaning travel step (step 118). At this time, the upper end of the cleaning block B(2,1) is not coincide with the travelling path of the cleaning region as shown in FIG. 9A, the control device 12 increases the "i" value by adding "1" (step 119), then, determines whether the upper end of the cleaning block B(3,1) of the third column and the first row is coincide with the travelling path of the cleaning region which has been determined in the above learning travel step (step 118).

At this time, the upper end of the cleaning block B(3,1) of the third column and the first row is coincide with the travelling path of the cleaning region, the column number E(j)(L) of the clearing end block B(3,1) of the third column and the first row is described as E(1)(1)=3 (step 120).

Thereafter, the control device 12 increases the "i" value by adding "2" (step 121), then, compares the "i" value with the total number mk=4 of the longitudinal division lines in order to determine whether the "i" value is larger than or equal to the total number mk=4 (step 122). At this time, the "i" value (i=5) is larger than the total number mk=4, thus, the control device 12 increases the "j" value by adding "1" (step 123). In result, the "j" value will be set as "2", that is, j=2.

Thereafter, the control device 12 determines whether the "j" value of the second row (j=2) is equal to the total number mk=4 of the longitudinal division lines (step 124). At this time, the "j" value of the second row (j=2) is not equal to the total number mk=4, thus, the control device 12 sets initial conditions of i=1 and L=0 (step 125).

Upon setting the initial conditions of i=1 and L=0 as described above, the control device 12 again performs the above-mentioned steps which starts from the step 111 wherein it is determined whether the lower end of a cleaning block B(i,j) of the i-th column and the j-th row is coincide with the travelling path of the cleaning region which has been determined in the above learning travel step until the j value of the second row (j=2) is equal to the total number mk=4 of the longitudinal division lines. In result, as shown in FIG. 9C which is a table showing results of the cleaning block discriminating step, the column numbers S(i)(L) and E(j)(L) of the cleaning start block and the cleaning end block, respectively, in case of integrating the cleaning blocks B(2,1) and B(3,1) of the first row into an integrated cleaning region is described as S(1)(1)=2 and E(1)(1)=3, respectively.

In the same manner, the column numbers S(i)(L) and E(j)(L) of the cleaning start block and the cleaning end block, respectively, in case of integrating the cleaning blocks B(1,2), B(2,2) and B(3,2) of the second row into an integrated cleaning region is described as 8(2)(1)=1 and E(2)(1)=3, respectively. On the other hand, the column numbers S(i)(L) and E(j)(L) of the cleaning start block and the cleaning end block, respectively, in case of integrating the cleaning blocks B(1,3) and B(2,3) of the third row into an integrated cleaning region is described as S(3)(1)=1 and E(3)(1)=2, respectively.

The above-mentioned cleaning region shown in FIG. 9A has one cleaning layer, that is, ML=1.

However, there may be another type of cleaning region which has two cleaning layers (ML=2), as shown in FIG. 9D. That is, the cleaning region of the first row is divided by a cleaning block B(2,1) of the first row and the second column into two layers, a first cleaning layer comprising a lower cleaning block B(1,1) and a second cleaning layer comprising two upper cleaning blocks B(3,1) and B(4,1).

In this case, the two-dimensional coordinates of the cleaning start blocks are described as B(1,1), B(3,1), B(1,2) and B(1,3), while the two-dimensional coordinates of the cleaning end blocks are described as B(1,1), B(4,1), B(4,2) and B(3,3).

On the other hand, the cleaning start block and the cleaning end block are determined from the column numbers S(i)(L) and E(j)(L) of the cleaning start block and the cleaning end block which are determined in the above-mentioned cleaning block discriminating step.

In other word, as shown in the result table of FIG. 9C, the column number of the cleaning start block of the first row is S(1)(1)=2 so that the cleaning start block of the first row is the cleaning block B(2,1) of the second column and the first row, while the column number of the cleaning start block of the second row is S(2)(1)=1 so that the cleaning start block of the second row is the cleaning block B(1,2) of the first column and the second row. In the same manner, the column number of the cleaning start block of the third row is S(3)(1)=1, so that the cleaning start block of the third row is the cleaning block B(1,3) of the first column and the third row (see FIG. 9A).

On the other hand, as shown in the result table of FIG. 9C, the column number of the cleaning end block of the first row is E(1)(1)=3 so that the cleaning end block of the first row is the cleaning block B(3,1) of the third column and the first row. In the same manner, the column number of the cleaning end block of the second row is E(2)(1)=3 so that the cleaning end block of the second row is the cleaning block B(3,2) of the third column and the second row. In addition, the column number of the cleaning end block of the third row is E(3)(1)=2, thus, the cleaning end block of the third row is the cleaning block B(2,3) of the second column and the third row (see FIG. 9A).

Turning next to FIGS. 6 and 10, in which FIG. 6 is a flowchart showing the process for performing the practical cleaning step 63 of FIG. 2, and FIG. 10 is a schematic view showing the trace of wheels of the cleaner resulting from the travelling and cleaning operation by the process of FIG. 6.

As shown in the flowchart of FIG. 6, upon having set initial conditions of i=0, j=1 and L=1 (step 130), the control device 12 controls the cleaner to start the travelling operation along the first travelling path from the start position SP toward the left side lower end position of the cleaning start block B[S(j)(L),j], that is, B(2,1), which is an initial cleaning position of the first integrated cleaning region which is to be first cleaned (step 131). At this time, the cleaning start block B[S(j)(L),j] is determined by substituting "1" and "1" for "j" and "L", respectively, that is, B[S(j)(L),j]=B[S(1)(1),1], wherein S(1)(1)=2 as described above. Thus, a B[S(j)(L),j]=B(2,1).

On the other hand, the cleaning end block B[E(j)(L),j] is determined by substituting "1" and "1" for "j" and "L", respectively, that is, B[E(j)(L),j]=-B[E(1)(1),1], wherein E(1)(1)=3 as described above. Thus, B[E(j)(L),j]=B(3,1).

Thereafter, the control device 12 calculates the lateral distance H and the longitudinal distance V of the above first integrated cleaning region which comprises the cleaning start block B(2,1) and the cleaning end block B(3,1) (step 132).

As shown in FIG. 7, the lateral distance H and the longitudinal distance V of the above integrated cleaning region are H=15 and V=30, respectively.

Sequentially, the control device 12 divides the lateral distance H by any even number "n" in order to calculate the minimum even number =n" which is shorter than the width "W" of the cleaner, then calculates the overlapping value X=(W−1/n) on the basis of the minimum even number "n" (step 133). Thereafter, the control device 12 controls the cleaner to travel along the straight paths in the longitudinal distance V, and turn in the 180° turning right at the turning position in order to reverse the path direction thereof simultaneously with overlapping the cleaning block in the overlapping value X=(W−1/n) (step 134). Thereafter, the control device 12 controls the cleaner to travel along the straight paths in the longitudinal distance V, and turn in the 180° turning left at the turning position in order to reverse the path direction thereof simultaneously with overlapping the cleaning block in the overlapping value X=(W−1/n) (step 135).

In addition, the control device 12 increases the "i" value by adding "2" (step 136), then determines whether the "i" value is equal to the minimum even number "n" (step 137). If the "i" value is not equal to the minimum even number "n", the control device 12 repeatedly performs the steps 134 to 137 until the "i" value is equal to the minimum even number "n".

If it is determined at the step 137 that the "i" value is equal to the minimum even number "n", it is considered that the cleaning operation for the first integrated cleaning region comprising the cleaning start block B(2,1) and the cleaning end block B(3,1). In result, the control device 12 increases the "j" value by adding "1" (step 138), then determines whether the "j" value is equal to the total number (mk=4) of the longitudinal division lines (step 139).

At this time, because the "j" value (j=2) is not equal to the total number (mk=4) of the longitudinal division lines. Thus, the control device 12 sets the "i" value as "0" (step 141), then again performs the step 131 in order to control the cleaner to return to the left side lower end position of the cleaning start block B[S(j)(L),j] of a second integrated cleaning region which is to be second cleaned and comprises the cleaning blocks B(1,2), B(2,2) and B(3,2) of the second row.

Thereafter, the control device 12 controls the cleaner to travel along the second integrated cleaning region comprising the cleaning blocks B(1,2), B(2,2) and B(3,2) of the second row in the same manner as described above.

Upon accomplishing the travelling and cleaning operation for the second integrated cleaning region, the control device 12 controls the cleaner to travel along the third integrated cleaning region comprising the cleaning blocks B(1,3) and B(2,3) of the third row in the same manner as described above.

Thereafter, if it is determined at the step 139 that the "j" value is equal to the total number (mk=4) of the longitudinal division lines, the control device 12 determines whether the "L" value is equal to the total number ML of cleaning layers (step 140). At this time, it is determined that the "L" value (L=1) is equal to the total number (ML=1) of cleaning layer in case of the cleaning region shown in FIG. 9A, that is, L=ML, thus, it is considered that the travelling and cleaning operation of the cleaner for the cleaning region has been accomplished. Thus, the control device 12 ends the control for the cleaner i n order to end the process for controlling the travelling and cleaning operation of the cleaner.

However, in case of controlling the travelling and cleaning operation of the cleaner for the another type of cleaning region (ML=2) shown in FIG. 9D, at the step 140 it is determined that the "L" value (L=1) is not equal to the total number (ML=2) of cleaning layers of the cleaning region. In result, the control device 12 increases the "L" value by "1" (step 142), then sets the "j" value as "1". Thereafter, the control device 12 repeatedly performs the steps 131 to 140, in which at the step 131 the control device 12 controls the cleaner to return to the initial position of the cleaning start block B[S(j)(L),j], until it is determined that the "L" value is equal to the total number (ML=2) of the cleaning layers.

Accordingly, the control device 12 controls the cleaner to efficiently performs the travelling and cleaning operation thereof for the cleaning region comprising the two layers of cleaning blocks B(1,1), B(3,2) and B(4,1), as shown in FIG. 9D.

As described above, the present invention provides a method for automatically controlling a travelling and cleaning operation of a vacuum cleaner in which a cleaning region is designated by using data corresponding to sectional distances of travelling paths of the outline of the cleaning region and path directions, then the cleaner is controlled by means of a control device in order to travel along the designated cleaning region in accordance with a control by using data corresponding to the cleaning region, thereby providing advantage in that the cleaning region is not limited by the memory capacity of a control device so that the cleaner automatically performs a travelling and cleaning operation for a cleaning region regardless of dimensions of the cleaning regions, Furthermore, the method of this invention provides another advantage in that the cleaner is controlled to travel along the sequential cleaning blocks simultaneously with overlapping a predetermined width of each cleaning block, thereby improving the cleaning effect of the cleaner for the cleaning region, Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A method for automatically controlling a travelling and cleaning operation of a vacuum cleaner comprising:

a learning travel step for calculating straight travelling distances of respective outline paths of a cleaning region and path directions of next travelling paths after a 90° turning right or left, then storing said straight travelling distances of the outline paths and said path directions of the next travelling paths after the 90° turning right or left in a storage device together with the total number of the outline paths;

a two-dimensional coordinates calculating step for determining respective relative positions of straight division lines on the basis of 90° turning points by using data corresponding to the straight travelling distances and the path directions, each of said straight division lines parallels the x-axis or the y-axis, then calculating two-dimensional coordinates of cleaning blocks which are used to determine positions and areas of respective cleaning blocks which are divided by said straight division lines;

a cleaning block discriminating step for delimiting, on the basis of said two-dimensional coordinates of the cleaning blocks, a plurality of integrated cleaning regions each comprising a plurality of sequential cleaning blocks of which each lower end coincides with an outline path of the cleaning region, and determining a cleaning start block and a cleaning end block of each of said integrated cleaning regions; and a practical cleaning step for controlling said cleaner to sequentially travel along said integrated cleaning regions such that the cleaner straightly travels along a straight travelling path from said cleaning start block to said cleaning end block of each of said integrated cleaning regions, turns in 180° turning reverse at a turning reverse position, then straightly travels from said cleaning end block to said cleaning start block simultaneously overlapping the cleaning blocks designated by a predetermined overlapping value.

2. A method as claimed in claim 1, wherein said learning travel step comprising the steps of:

storing a path direction of a straight travelling path with respect to a start position during initial designation for the cleaning region by controlling the cleaner to travel along said straight travelling path after having located the cleaner at said start position of the outline paths of the cleansing region;

storing a straight travelling distance of the straight travelling path as a 90° turning right or left signal has been received, storing a path direction according to said 90° turning right or left signal, controlling the cleaner to turn in 90° turning right or left and travel along a next straight travelling path; and repeatedly performing the above steps until the cleaner reaches an end position of the outline paths, then calculating said total number of the outline paths as the designation for the cleaning region has been accomplished.

3. A method as claimed in claim 2, wherein a path directional value of 0, 1, 2, 3 is stored for each path direction corresponding respectively to the straight travelling, the 90° turning right, the 180° turning reverse, the 90° turning left.

4. A method as claimed in claim 2 or 3, wherein said step for storing said straight travelling distance further comprising:

upon having received said 90° turning left signal, storing said straight travelling distance of the straight travelling path, increasing path number by adding 1, subtracting 1 from a path directional value of a previous travelling path in order to calculate a result path directional value, then substituting the path directional value for the 90° turning left for said result path directional value in case that it is determined that the result path directional value is −1, but setting the result path directional value as it was in case that it is determined that the result path directional value is not −1, thereafter controlling the cleaner to turn in the 90° turning left prior to a next straight travelling; and upon having received said 90° turning right signal, storing the straight travelling distance of the straight travelling path, increasing said path number by adding 1, adding 1 to said path directional value of the previous travelling path in order to calculate another result path directional value, then substituting the path directional value for the straight travelling for said another result path directional value in case that it is determined that the result path directional value is 4, but setting the another result path directional value as it was in case that it is determined that the another result path directional value is not 4, thereafter controlling the cleaner to turn in the 90° turning right prior to a next straight travelling.

5. A method as claimed in claim 1, wherein said two-dimensional coordinates calculating step comprising the steps of:

setting an initial condition for a x-coordinate of a longitudinal division line and a y-coordinate of a lateral division line, then determining a path direction of the first travelling path in order to calculate said x-coordinate or said y-coordinate on the basis of a turning position in accordance with a result of said determination for the path direction;

sequentially calculating x-coordinates or y-coordinates of next sequential travelling paths in the same manner as that of the above coordinate determining step;

calculating the total numbers of the longitudinal division lines and the lateral division lines, respectively; and sequentially classifying the x-coordinates and the y-coordinates in an order from a relatively smaller value of coordinate to a relatively larger value of coordinate, then calculating two-dimensional coordinates of cross points of the lateral division lines with the longitudinal division lines.

6. A method as claimed in claim 5, wherein said two-dimensional coordinates calculating step further comprising the steps of:

upon determining that said path direction of the first travelling path is a straight travelling, increasing the number of longitudinal division line by adding 1, then adding a straight travelling distance of the present travelling path to a previous y-coordinate in order to calculate a present y-coordinate;

upon determining that said path direction of the first travelling path is 90° turning right, increasing the number of the lateral division line by adding 1, then adding the straight travelling distance of the present travelling path to a previous x-coordinate in order to calculate a present x-coordinate;

upon determining that said path direction of the first travelling path is a turning reverse, increasing the number of the longitudinal division line by adding 1, then subtracting the straight travelling distance of the present travelling path from the previous y-coordinate in order to calculate a present y-coordinate; and upon determining that said path direction of the first travelling path is a 90° turning left, increasing the number of the lateral division line by adding 1, then subtracting the straight travelling distance of the present travelling path from the previous x-coordinate in order to calculate a present x-coordinate.

7. A method as claimed in claim 1, wherein said cleaning block discriminating step comprising the steps of:

setting an initial condition for a cleaning layer number and a maximum number of cleaning layers of the cleaning region;

determining whether a lower end of a cleaning block of an initial cleaning position coincides with an outline path of the cleaning region upon simultaneously increasing a column number by adding 1, thereby calculating column number of a cleaning start block;

determining whether an upper end of said cleaning block of the initial cleaning position coincides with an outline path of the cleaning region upon simultaneously increasing said column number by adding 1, thereby calculating column number of a cleaning end block; and repeatedly performing the above steps under the condition of sequentially increasing a row number of a cleaning block by adding 1, thereby calculating column numbers for the cleaning start blocks and the cleaning end blocks, respectively.

8. A method as claimed in claim 7, wherein said cleaning block discriminating step further comprising:

after calculating the column number of the cleaning start block, increasing the column number of the cleaning start block by adding 2, then increasing the column number of the cleaning start block by adding 1 in case that the column number is smaller than the total number of the longitudinal division lines, thereafter, calculating the column numbers of the cleaning start blocks in case that said layer number is smaller than said maximum number of cleaning layers of the cleaning region.

9. A method as claimed in claim 1, wherein said practical cleaning step comprising the steps of:

calculating a lateral distance and a longitudinal distance of a first integrated cleaning region after having controlled the cleaner to travel along a cleaning start block of said first integrated cleaning region;

dividing said lateral distance by any even number in order to calculate a minimum even number which is shorter than a width of the cleaner;

repeatedly controlling the cleaner to travel along a straight path in said longitudinal distance, and turn in the 180° turning reverse at a turning position in order to reverse the path direction of the cleaner simultaneously overlapping the cleaning block designated by an overlapping value until the column number is equal to said minimum even number; and controlling the cleaner to sequentially move to a cleaning start block of a next integrated cleaning region, then repeatedly performing the above steps.

10. A method as claimed in claim 1, wherein said overlapping value satisfies the following formula;

$$X=(W-1/n)$$

wherein
X: overlapping value
W: width of a cleaner
n: minimum even number.

* * * * *

UNITED STATES PATENT AND TRADEMARK OFFICE
CERTIFICATE OF CORRECTION

PATENT NO. : 5,353,224
DATED : October 4, 1994
INVENTOR(S) : Lee et al.

It is certified that error appears in the above-indentified patent and that said Letters Patent is hereby corrected as shown below:

<u>Column 2, line 5</u>, "31" should read --31 is--;

<u>Column 8, line 31</u>, "-1," should read -- -1.--;

<u>Column 9, line 14</u>, "path (i = 3) in a predetermined dis-" should read --distance PL(3) in the third travelling--;

<u>Column 13, line 49</u>, "8(2)(1) = 1" should read --S(2)(1) = 1--;

<u>Column 14, line 51</u>, "Thus, a" should read --Thus,--;

<u>Column 14, line 68</u>, "=n'" should read --"n"--;

<u>Column 18, line 42</u>, "is" should read --is a--.

Signed and Sealed this

Thirty-first Day of January, 1995

BRUCE LEHMAN

*Attest:*

*Attesting Officer*            Commissioner of Patents and Trademarks